US009454068B2

(12) United States Patent
Tanaka

(10) Patent No.: US 9,454,068 B2
(45) Date of Patent: Sep. 27, 2016

(54) PROJECTION-TYPE IMAGE DISPLAY APPARATUS INCLUDING LIGHT SOURCE UNIT WITH DICHROIC MIRROR

(71) Applicant: Panasonic Intellectual Property Management Co., Ltd., Osaka (JP)

(72) Inventor: Takaaki Tanaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/876,408

(22) Filed: Oct. 6, 2015

(65) Prior Publication Data

US 2016/0026077 A1 Jan. 28, 2016

Related U.S. Application Data

(63) Continuation of application No. PCT/JP2014/002137, filed on Apr. 15, 2014.

(30) Foreign Application Priority Data

Apr. 18, 2013 (JP) .................................. 2013-087161
Jul. 4, 2013 (JP) .................................. 2013-140453
Nov. 5, 2013 (JP) .................................. 2013-229153
Nov. 5, 2013 (JP) .................................. 2013-229154

(51) Int. Cl.
*G03B 21/20* (2006.01)
*H04N 9/31* (2006.01)
(Continued)

(52) U.S. Cl.
CPC ........... *G03B 21/2066* (2013.01); *G03B 21/14* (2013.01); *G03B 21/204* (2013.01);
(Continued)

(58) Field of Classification Search
CPC ............ G03B 21/204; G03B 21/2066; G03B 21/2073; H04N 9/3111; H04N 9/3114; H04N 9/3158; H04N 9/3164
See application file for complete search history.

(56) References Cited

U.S. PATENT DOCUMENTS 7,070,300 B2 * 7/2006 Harbers ............. G02B 27/1046
257/E33.071
8,342,697 B2 * 1/2013 Iwanaga ........................ 348/743
(Continued)

FOREIGN PATENT DOCUMENTS

JP H05-005962 A 1/1993
JP H06-067139 A 3/1994
(Continued)

OTHER PUBLICATIONS

International Search Report for corresponding International Application No. PCT/JP2014/002137 mailed Jul. 8, 2014.
(Continued)

*Primary Examiner* — Bao-Luan Le
(74) *Attorney, Agent, or Firm* — Renner, Otto, Boisselle & Sklar, LLP

(57) ABSTRACT

A projection-type image display apparatus includes a light source unit that emits light, an image generating unit that generates image light according to an input video signal, a light-guide optical system that guides the light from the light source unit to the image generating unit, and a projection optical system that projects the image light generated by the image generating unit. The light source unit includes a light source that produces light, phosphor that is excited by the light from the light source, and a dichroic mirror that directs the light from the light source to the phosphor. The dichroic mirror is arranged with an incident angle of the light from the light source being 50° or more and 60° or less.

4 Claims, 7 Drawing Sheets

(51) Int. Cl.
  *G03B 21/14* (2006.01)
  *G03B 29/00* (2006.01)
  *G02B 27/14* (2006.01)

(52) U.S. Cl.
  CPC ....... *G03B21/2006* (2013.01); *G03B 21/2073* (2013.01); *G03B 29/00* (2013.01); *H04N 9/315* (2013.01); *H04N 9/3111* (2013.01); *H04N 9/3114* (2013.01); *H04N 9/3158* (2013.01); *H04N 9/3164* (2013.01); *G02B 27/141* (2013.01)

(56) References Cited

U.S. PATENT DOCUMENTS

| | | | | |
|---|---|---|---|---|
| 8,405,014 B2* | 3/2013 | Shibasaki | G03B 21/2013 | 250/205 |
| 8,562,146 B2* | 10/2013 | Kitano | G03B 21/204 | 353/31 |
| 8,915,597 B2* | 12/2014 | Kitano | H04N 9/3105 | 353/94 |
| 9,300,929 B2* | 3/2016 | Kashiwagi | G02B 7/006 | |
| 2003/0189676 A1 | 10/2003 | Kato | | |
| 2005/0270775 A1* | 12/2005 | Harbers | G02B 27/1046 | 362/231 |
| 2010/0328617 A1* | 12/2010 | Masuda | G03B 21/14 | 353/31 |
| 2011/0063581 A1* | 3/2011 | Iwanaga | G03B 21/204 | 353/31 |
| 2011/0096300 A1* | 4/2011 | Shibasaki | G03B 21/2013 | 353/85 |
| 2012/0026472 A1* | 2/2012 | Masuda | G03B 21/204 | 353/85 |
| 2012/0081674 A1 | 4/2012 | Okuda | | |
| 2012/0127435 A1* | 5/2012 | Kitano | G03B 21/204 | 353/20 |
| 2012/0140183 A1 | 6/2012 | Tanaka et al. | | |
| 2012/0188516 A1* | 7/2012 | Kashiwagi | G02B 7/006 | 353/31 |
| 2012/0242912 A1* | 9/2012 | Kitano | H04N 9/3111 | 348/759 |
| 2012/0268917 A1* | 10/2012 | Kitano | H04N 9/3105 | 362/84 |
| 2013/0088689 A1* | 4/2013 | Lin | G03B 21/204 | 353/31 |
| 2013/0242268 A1* | 9/2013 | Saitou | G03B 21/2013 | 353/31 |
| 2013/0322056 A1* | 12/2013 | Konuma | F21V 13/14 | 362/84 |
| 2014/0078475 A1* | 3/2014 | Masuda | G03B 21/14 | 353/84 |

FOREIGN PATENT DOCUMENTS

| | | |
|---|---|---|
| JP | H11-064843 A | 3/1999 |
| JP | 2003-029331 A | 1/2003 |
| JP | 2004-341105 A | 12/2004 |
| JP | 2005-300900 A | 10/2005 |
| JP | 2008-185757 A | 8/2008 |
| JP | 2008-298951 A | 12/2008 |
| JP | 2011-070082 A | 4/2011 |
| JP | 2011-128340 A | 6/2011 |
| JP | 2012-078488 A | 4/2012 |
| JP | 2012-108486 A | 6/2012 |
| JP | 2012-123179 A | 6/2012 |
| JP | 2012-123180 A | 6/2012 |
| JP | 2012-137744 A | 7/2012 |
| WO | WO 2012/077191 A1 | 6/2012 |

OTHER PUBLICATIONS

International Preliminary Report on Patentability for corresponding International Application No. PCT/JP2014/002137 mailed Oct. 20, 2015.

* cited by examiner

PROJECTION-TYPE IMAGE DISPLAY APPARATUS INCLUDING LIGHT SOURCE UNIT WITH DICHROIC MIRROR

CROSS-REFERENCE TO RELATED APPLICATIONS

This is a continuation application of International Application No. PCT/JP2014/002137 with an international filing date of Apr. 15, 2014, which claims priority of Japanese Patent Application Nos. 2013-087161 filed on Apr. 18, 2013, 2013-140453 filed on Jul. 4, 2013, 2013-229153 filed on Nov. 5, 2013, and 2013-229154 filed on Nov. 5, 2013, the contents of which are incorporated herein by reference.

BACKGROUND

1. Technical Field

The present disclosure relates to a projection-type image display apparatus projecting video light onto a projection surface.

2. Related Art

Today a projector is widely prevalent as a projection-type image display apparatus that enlarges and projects various images, or the like.

The projector modulates light emitted from a light source according to a video signal with a spatial light modulator such as a digital micromirror device (DMD) or a liquid-crystal display element, to project the modulated light on the screen.

Various projectors have also been developed that are disposed on a ceiling to project images on a floor or a wall surface. The projectors disposed for use on the ceiling entail various problems to be studied, such as necessity for dedicated holders or wiring works, storage method, device size reduction, easiness in work, ease of use, and a sense of beauty.

In view of these problems, Japanese Laid-Open Patent Publication No. 2008-185757 for example proposes a projection-type image display apparatus having a connector attachable to illumination wiring fixtures and having an illumination device disposed on a housing surface corresponding to the floor.

The conventional projector is provided with the connector connectable to wiring for illumination arranged on the ceiling, and thus the projector can easily be disposed on the ceiling. The illumination device is provided on the surface of a housing facing the floor surface, and thus the projector is usable as an illumination device unless it projects a video, enabling it to be disposed at all times.

The projection-type image display apparatus is generally desired to be compact in the light of portability or area which the display apparatus occupies. Particularly, in the case of the projector disposed on the ceiling, miniaturization of the device is desired also in the light of strength of the ceiling or visual aesthetic sense.

SUMMARY

The present disclosure provides a projection-type image display apparatus capable of being miniaturized.

A projection-type image display apparatus of the present disclosure includes a light source unit that emits light, an image generating unit that generates image light according to an input video signal, a light-guide optical system that guides the light from the light source unit to the image generating unit, and a projection optical system that projects the image light generated by the image generating unit. The light source unit includes a light source that produces light, phosphor that is excited by the light from the light source, and a dichroic mirror that directs the light from the light source to the phosphor. The dichroic mirror is arranged with an incident angle of the light from the light source being 50° or more and 60° or less.

According to the present disclosure, there can be implemented a projection-type image display apparatus capable of being miniaturized and suppressing deterioration of the image quality.

DETAILED DESCRIPTION OF EMBODIMENTS

Embodiments will now be described in detail with proper reference to the drawings. Note however that excessively detailed description may be omitted. For example, detailed description of already well-known matters and repeated description of substantially the same configuration may be omitted. This is for the purpose of preventing the following description from becoming unnecessarily redundant, to facilitate the understanding of those skilled in the art.

The applicant provides the accompanying drawings and the following description in order for those skilled in the art to fully understand the present disclosure and it is not intended to limit the subject matters defined in the claims by them.

First Embodiment

1. Outline of Projection-Type Image Display Apparatus

Figure 1:
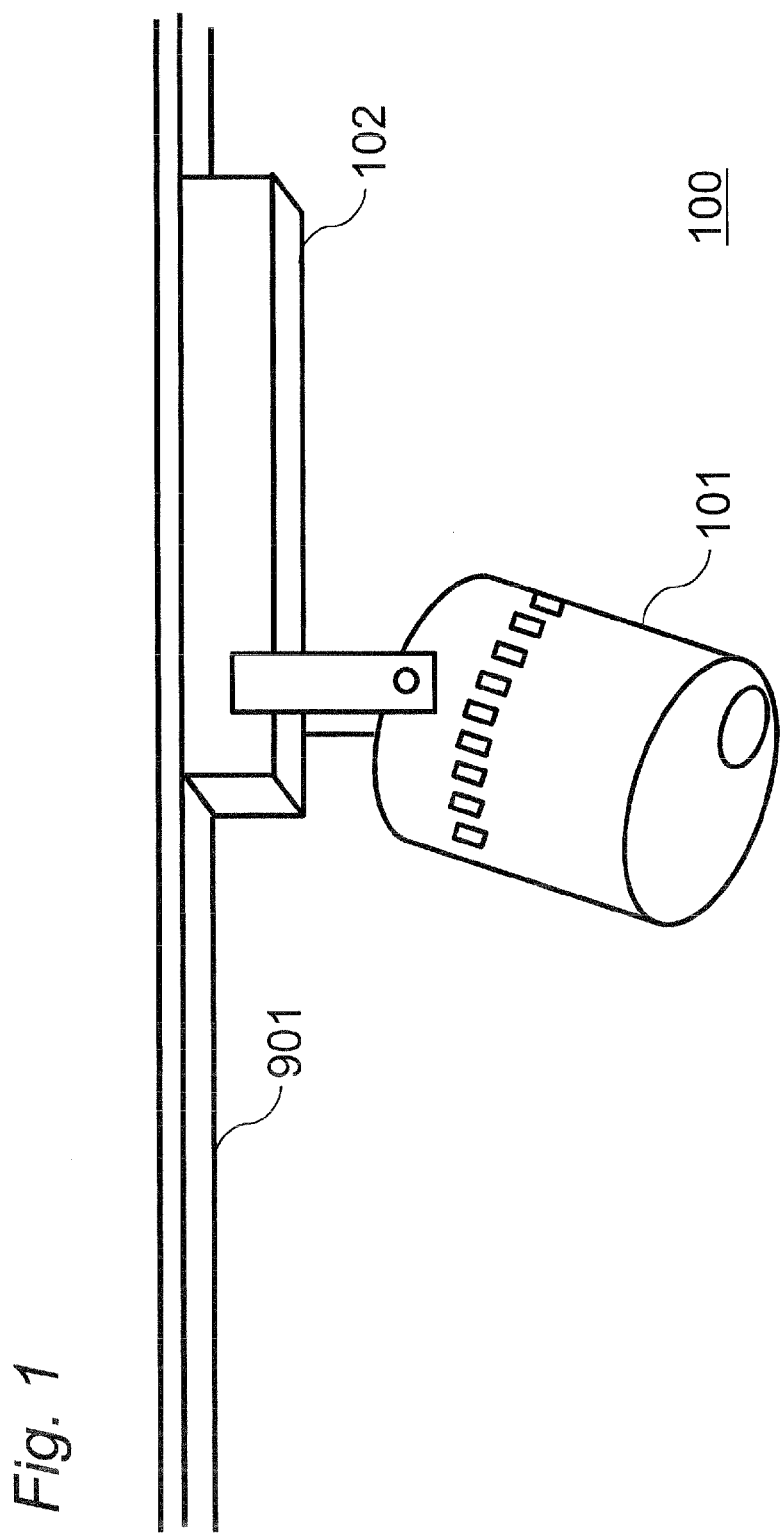
FIG. 1 is a perspective view of a projection-type image display apparatus according to the present disclosure.
Figure 2:
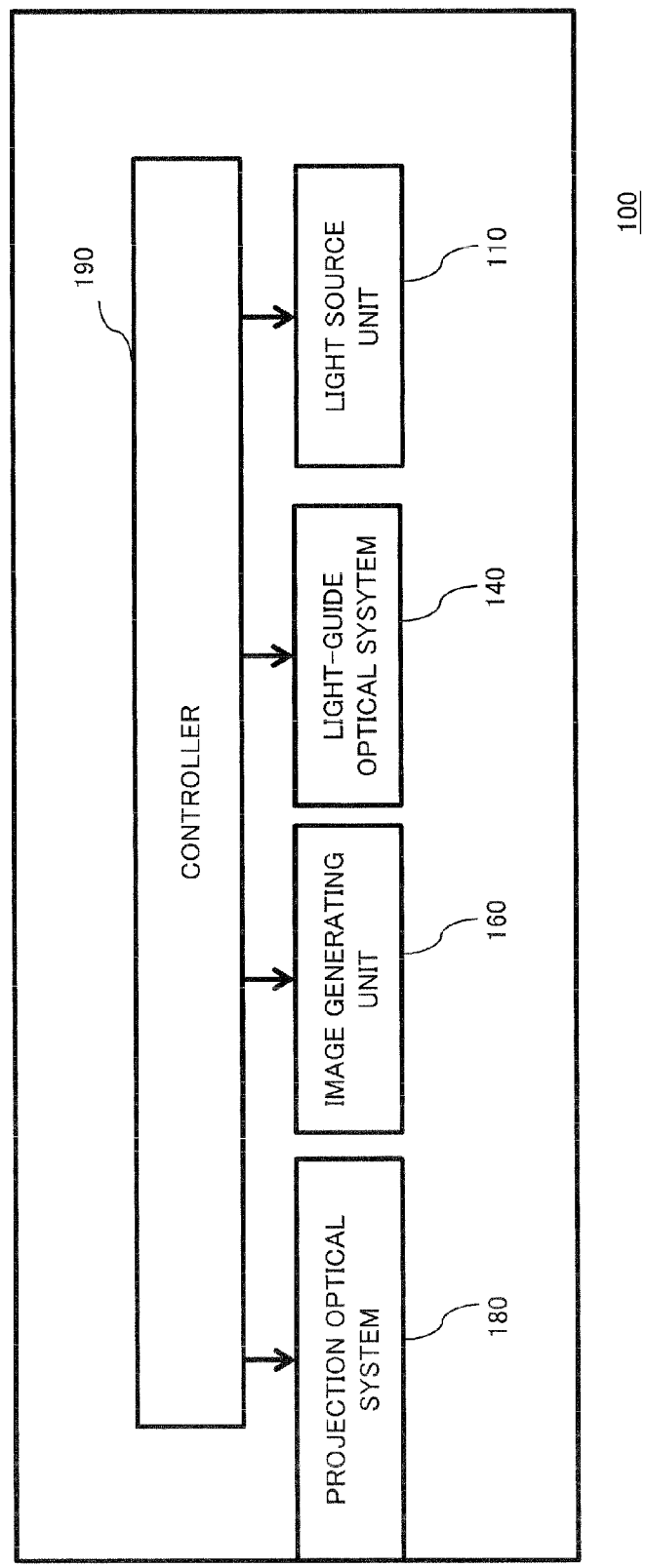
FIG. 2 is a block diagram showing the configuration of the projection-type image display apparatus.

A projection-type image display apparatus will be described below with reference to the drawings. FIG. 1 is a perspective view of the projection-type image display apparatus. A projection-type image display apparatus 100 includes a first housing 101 that houses a light source unit, etc., and a second housing 102 connected to a wiring duct 901 disposed on a ceiling FIG. 2 is a block diagram showing an internal configuration of the projection-type image display apparatus 100. The projection-type image display apparatus 100 is provided with a light source unit 110 that emits light, an image generating unit 160 that generates image light according to an input video signal, a light-guide optical system 140 that guides the light from the light source unit 110 to the image generating unit 160, a projection optical system 180 that projects the generated image light onto a screen (not shown), and a controller 190 that controls the light source unit 110, the image generating unit 160, and the like.

The light source unit 110 of the present disclosure has semiconductor lasers (laser diodes) which cause phosphor to emit light with the light from each semiconductor laser as excitation light. The light-guide optical system 140 includes optical members such as various lenses, mirrors, or rods to guide the light emitted from the light source unit 110 to the image generating unit 160. The image generating unit 160 uses elements such as a digital micromirror device (hereinafter, referred to as "DMD") and a liquid-crystal panel to spatially modulate the light according to a video signal. The projection optical system 180 includes optical members such as lenses and mirrors to enlarge and project the spatially modulated light onto the screen (projected surface).

2. Optical Configuration of Projection-Type Image Display Apparatus

Figure 3:
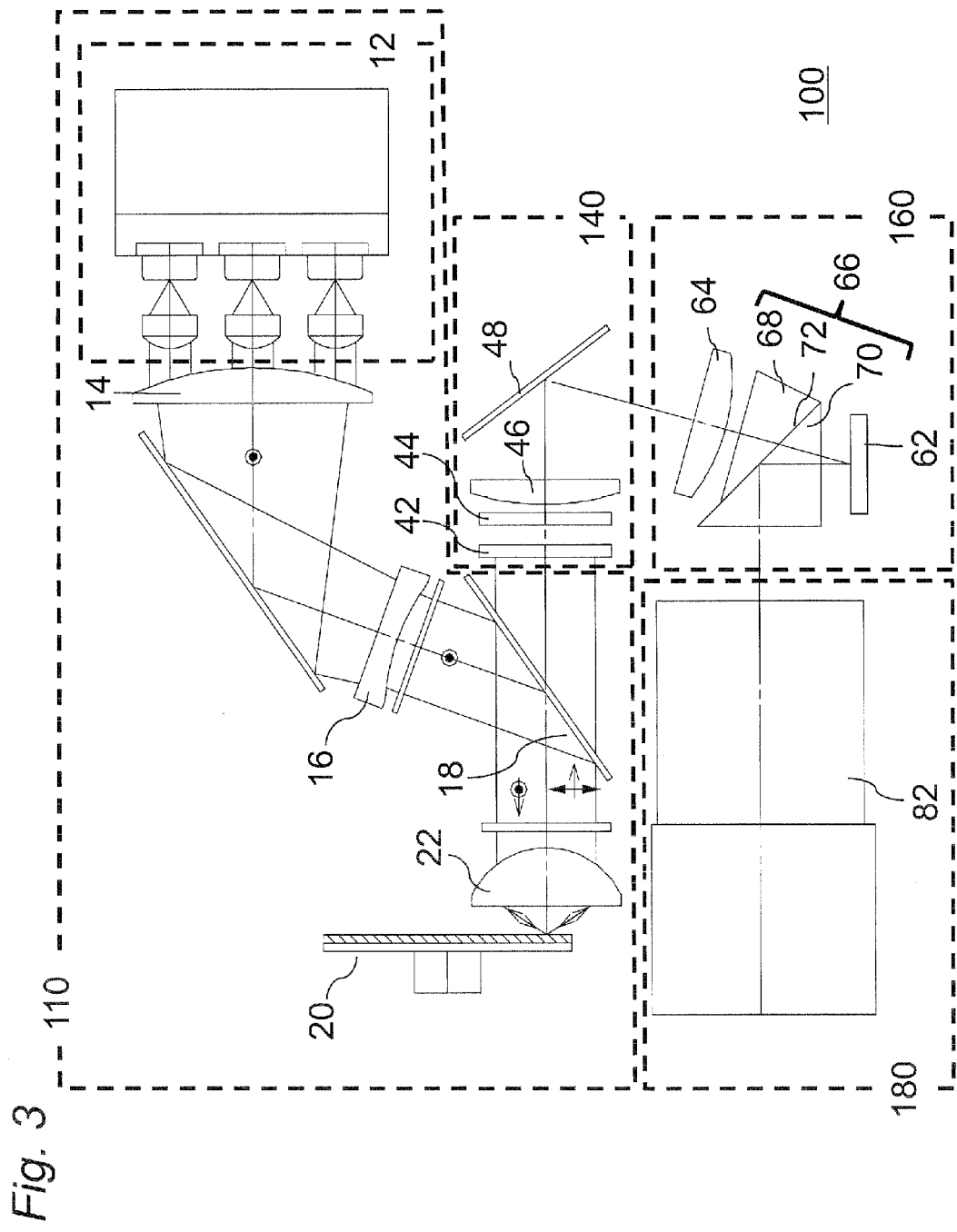
FIG. 3 is a schematic view explaining the optical configuration of the projection-type image display apparatus.

FIG. 3 is a schematic view explaining the optical configuration of the projection-type image display apparatus 100.

The projection-type image display apparatus 100 has the light source unit 110, the image generating unit 160 that generates image light according to an input video signal, the light guide optical system 140 that guides light from the light source unit 110 to the image generating unit 160, and the projection optical system 180 that projects the generated image light onto a screen (not shown).

Figure 4:
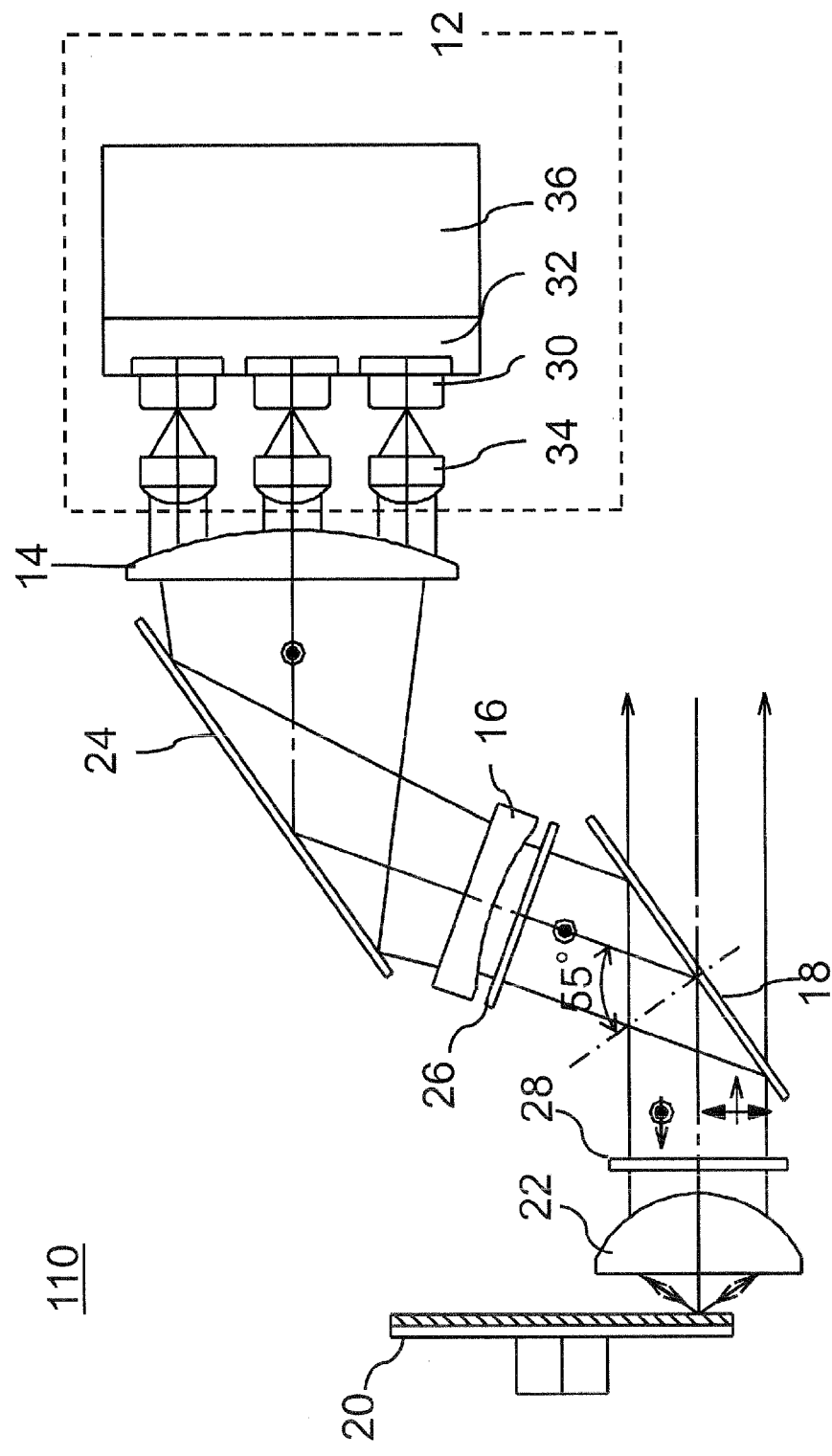
FIG. 4 is a schematic view explaining the optical configuration of a light source unit.

FIG. 4 is a view showing the detailed configuration of the light source unit 110. As shown in FIG. 4, the light source unit 110 is provided with a solid light source unit 12, a convex lens 14 that condenses parallel luminous flux from the solid light source unit 12, a concave lens 16 that again converts the light from the lens 14 into parallel light, and a mirror 24 interposed between the convex lens 14 and the concave lens 16. The light source unit 110 further includes a dichroic mirror 18 that changes the optical path of the parallel light from the lens 16, a phosphor wheel 20, and a lens 22 that condenses the parallel light onto the phosphor wheel 20. The dichroic mirror 18 is arranged with a tilt of 55° with respect to the optical axis of parallel light from the lens 16. The reason for such an arrangement will be described later. The light source unit 110 further has a diffuser 26 disposed posterior to the concave lens 16 to reduce the coherence while keeping the polarization property and a λ/4 plate 28 interposed between the dichroic mirror 18 and the lens 22.

The solid light source unit 12 includes twelve semiconductor lasers 30 and condenser lenses 34 arranged facing the semiconductor lasers 30. The semiconductor lasers 30 are arranged in a 3×4 matrix at regular intervals on a radiator plate 32. A heat sink 36 serves to cool the solid light source unit 12. The semiconductor lasers 30 emit linearly polarized blue color light with a wavelength width of 440 nm to 455 nm. The semiconductor lasers 30 are arranged such that the polarization direction of the emitted light is s-polarization with respect to the plane of incidence of the dichroic mirror 18.

The light emitted from the solid light source unit 12 is reduced in diameter by the convex lens 14 and the concave lens 16, entering the diffuser 26. The mirror 24 is disposed to change the optical path to cause the diameter-reduced luminous light to enter the posterior-located dichroic mirror 18 at an incident angle of 55°. The light leaving the diffuser 26 enters the dichroic mirror 18. The dichroic mirror 18 reflects the light from the diffuser 26 according to the spectral characteristics as shown below.

Figure 5:
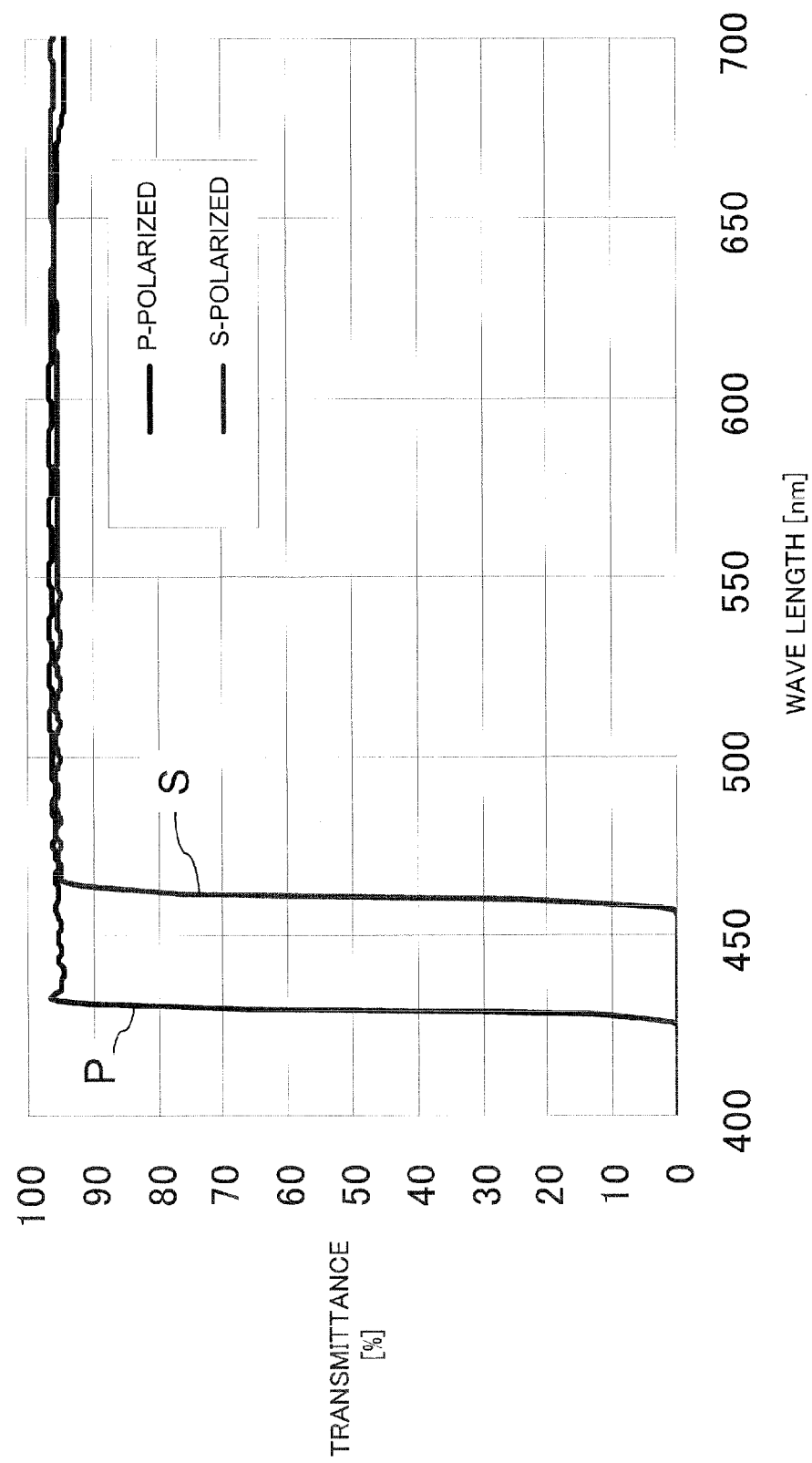
FIG. 5 is a graph showing the spectral characteristics of a dichroic mirror.

The spectral characteristics of the dichroic mirror 18 is explained below. FIG. 5 shows the spectral characteristics (55° incidence) of the dichroic mirror 18 according to the present disclosure. FIG. 5 shows the wavelength versus transmittance as the spectral characteristics. A line P represents characteristics for p-polarized light, while a line S represents characteristics for s-polarized light. According to the spectral characteristics of the dichroic mirror 18, about 94% or more p-polarized light at wavelengths of 440 nm to 445 nm transmits through the dichroic mirror 18. Similarly, the s-polarized light with 440 nm to 445 nm wavelength reflects at a high reflectance of 98% or more. Green color light to red color light with wavelengths of 490 nm to 700 nm transmit at a high transmittance of 95% or more in both the p-polarized light and the s-polarized light.

According to the above spectral characteristics, the light entering from the diffuser 26 is s-polarized blue color light having a wavelength width of 440 nm to 455 nm, and therefore the light is reflected by the dichroic mirror 18.

As shown in FIG. 5, a wavelength separation width d is approx. 30 nm through which P-polarized light and S-polarized light have a transmittance of 50%. This wavelength separation width d is longer than that (approx. 20 nm) for the case of the incident angle of 45°. Accordingly, a higher light separation ability between P-polarized light and S-polarized light is achieved, leading to an improved light usage efficiency.

Returning to FIG. 4, blue color light reflected by the dichroic mirror 18 is converted from linearly polarized light into circularly polarized light by the λ/4 plate 28. Circularly polarized blue color light is condensed by the lens 22 and is irradiated onto the phosphor wheel 20 with a spot diameter of 1 to 2 mm.

The phosphor wheel 20 is formed from an aluminum plate and is formed with a plurality of regions, i.e., a region B that is an area of a diffuse reflecting surface (not shown), a region G that is coated with phosphor for emitting green color light, and a region R that is coated with phosphor for emitting red color light.

Light irradiated on the phosphor wheel 20 is converted at the respective regions into blue, green, and red color light, which in turn is emitted toward the lens 22. The color light turns again to parallel light by the lens 22, entering the λ/4 plate 28. By again passing through the λ/4 plate 28, the blue color light is converted into p-polarized light, returning to the dichroic mirror 18. With the spectral characteristics, the blue color light again passes through the λ/4 plate 28 to pass through the dichroic mirror 18 together with the green and red color light. As a result, the blue, green, and red color lights are emitted from the light source unit 110 in a time sharing manner.

Referring back to FIG. 3, the light emitted from the light source unit 110 enters a pair of fly-eye lenses composed of a plurality of lens elements. Luminous flux entering a first lens array plate 42 is split into a multiplicity of luminous fluxes. The multiplicity of split luminous fluxes converge on a second lens array plate 44. The lens elements of the first lens array plate 42 have an opening analogous in shape to the DMD 62 of the image generating unit 160. The lens elements of the second lens array plate 44 have a focal length which is defined such that the first lens array plate 42 and the DMD 62 have a substantially conjugate relationship. The light leaving the second lens array plate 44 enters a lens 46. The lens 46 is a lens for superimposing, on the DMD 62, light leaving the lens elements of second lens array plate 44. The light from the lens 46 is reflected by a mirror 48 and thereafter passes through a lens 64 to enter a total reflection prism 66.

The total reflection prism 66 is composed of two prisms 68 and 70, with a thin air layer 72 being formed between surfaces of the two prisms. The air layer 72 totally reflects the light incident at an angle not less than a critical angle.

The light incident on the total reflection prism 66 via the lens 64 passes through a total reflection surface to enter the DMD 62. The DMD 62 deflects the micromirror so as to direct the light to a projection lens 82 and the light to the outside of the effective range of the projection lens 82 according to the video signal. The light reflected by the DMD 62 enters the air layer 72 at an angle not less than the critical angle, and hence is reflected toward the projection lens 82. In this manner, the image light formed by the DMD 62 is projected on a screen (not shown).

As described above, the dichroic mirror 18 is arranged with the angle of incident light from the light source unit 12 set 55°. This enables the dichroic mirror 18 and the mirror 24 disposed in parallel to the dichroic mirror 18 to be arranged at an angle nearly parallel to a path of light from the light source unit 12. It is thus possible to miniaturize the light source unit 110, in particular, to reduce the length thereof in the vertical direction of FIG. 4, and also to improve the light utilization efficiency. The reason to arrange the dichroic mirror 18 at an angle of incidence of 55° is described blow.

Figure 6:
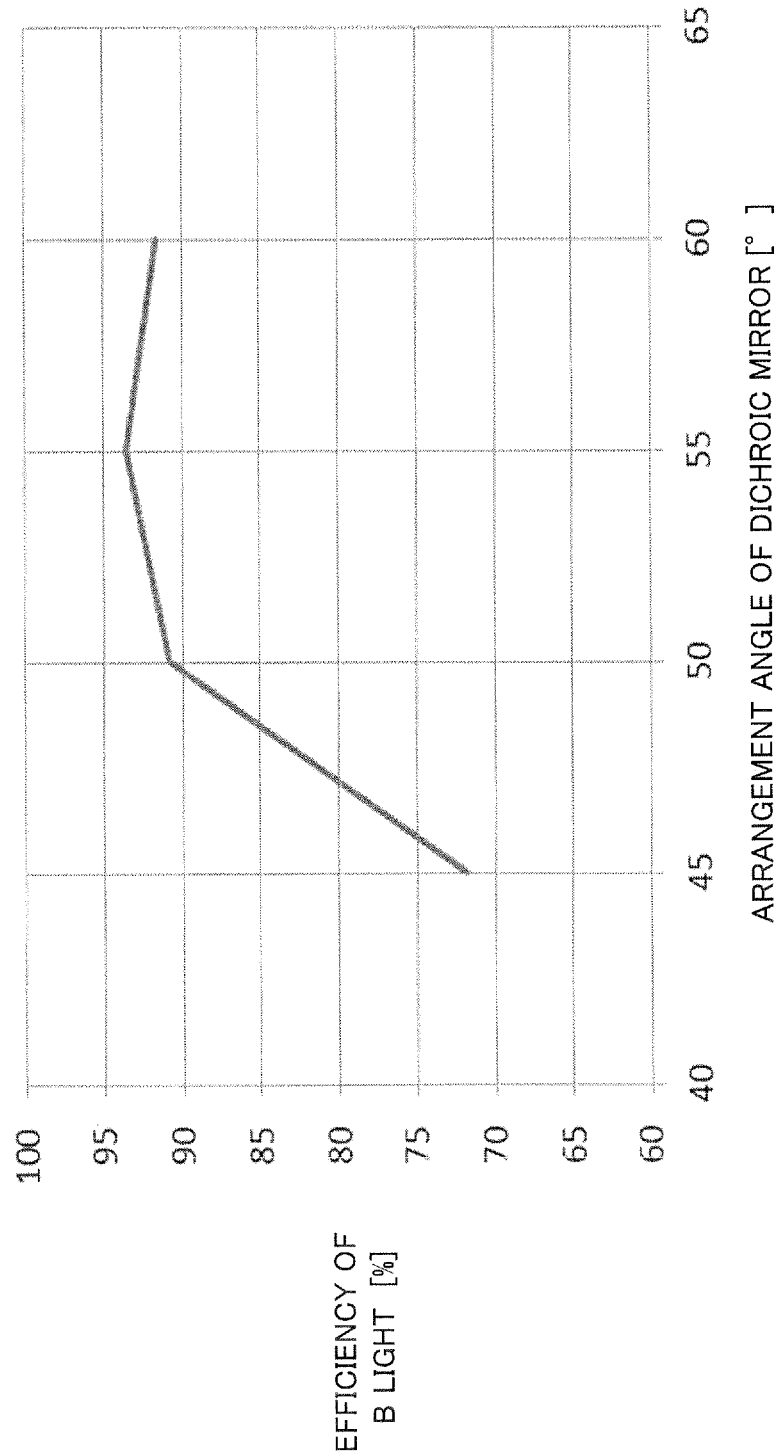
FIG. 6 is a view showing an efficiency of blue (B) light with respect to arrangement angle of a dichroic mirror.

FIG. 6 is a diagram showing an efficiency of the blue color light (B light) with respect to the arrangement angle (incident angle) of the dichroic mirror. The efficiency of the blue color light is a product of the reflectivity of S-polarized light and the transmittance of P-polarized light. In the case of FIG. 6, the emission wavelength of the semiconductor laser is 440 to 455 nm, a tolerance of the dichroic mirror 18 is ±3 nm, and a wavelength shift in the spectral characteristics relative to the incident angle to the dichroic mirror 18 is ±3 nm. The average efficiency is then obtained for the blue color light having wavelengths of 434 nm to 461 nm, with respect to the arrangement angle of the dichroic mirror 18. It can be seen that the efficiency of the blue color light at the arrangement angle of 55° is 1.3 times (130%) higher than that of the arrangement angle of 45°. In this manner, a relatively favorable efficiency is acquired when the arrangement angle is 55 degrees.

Figure 7:
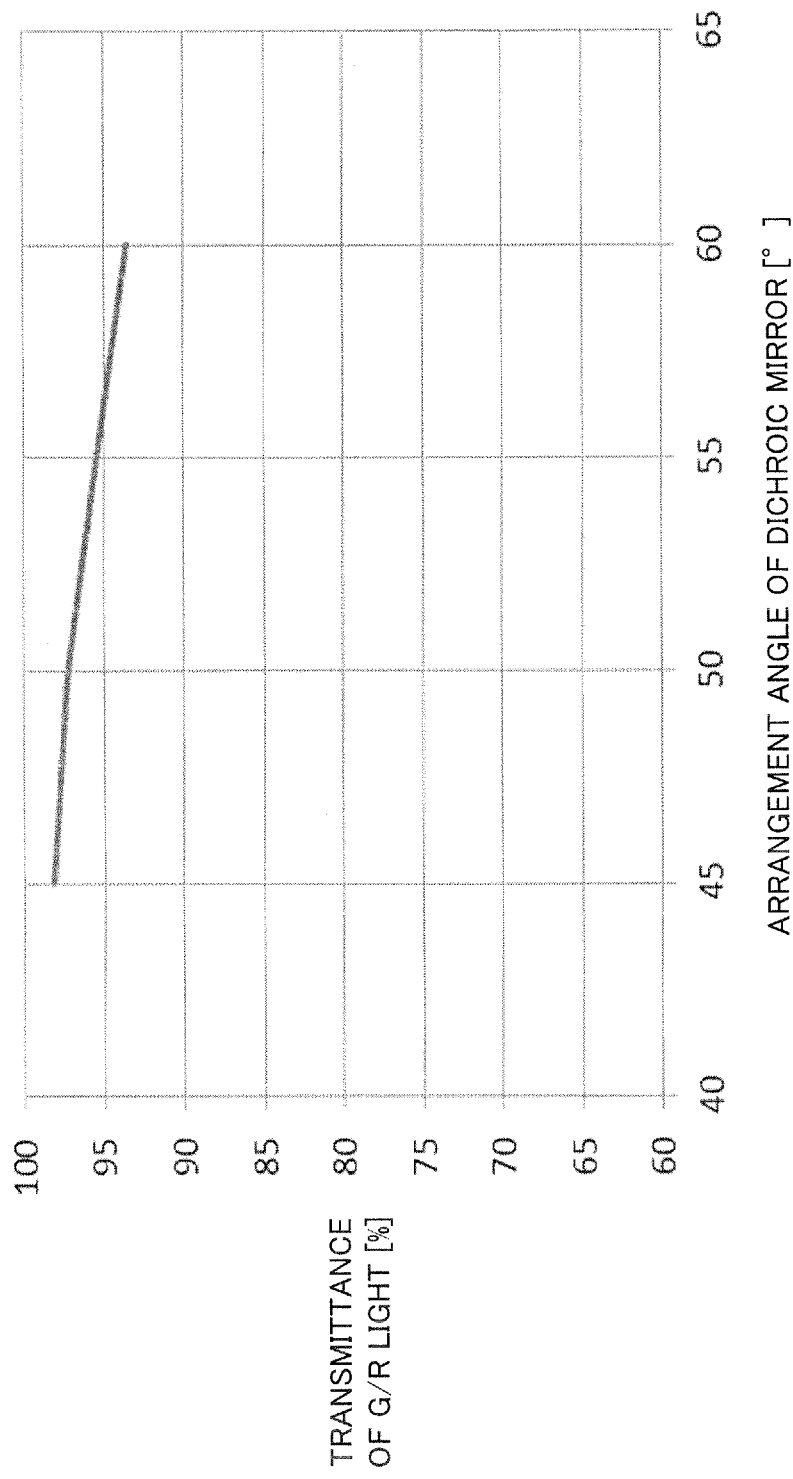
FIG. 7 is a view showing an efficiency of green (G) and red (R) lights with respect to arrangement angle of a dichroic mirror.

On the other hand, FIG. 7 is a diagram showing the average transmittance of green color light (G light) and red color light (R light) with respect to the arrangement angle of the dichroic mirror 18. The ratios of the transmittance in the arrangement angles 50°, 55°, and 60° to the transmittance in of the arrangement angle 45° are 99%, 97%, and 95%, respectively. That is, the transmittance of green color light (G light) and red color light (R light) for the arrangement angle 55° is inferior to that for the arrangement angle 45°. However, the efficiency of the blue color light for the arrangement angle 55° is much superior to that of the arrangement angle 45°.

In consideration of the efficiency of blue color light and the transmittance of green color light and red color light, a highest efficiency is obtained when the arrangement angle (reference incident angle) of the dichroic mirror 18 is 55° within the range of 50° to 60°. Thus, in the present embodiment, the arrangement angle of the dichroic mirror 18 is set to 55°.

Although in the present embodiment the arrangement angle of the dichroic mirror 18 is set to 55° from the above reason, the arrangement angle is not limited to 55°. The arrangement angle may be greater than 45°. Especially, when focusing on miniaturization, the arrangement angle is preferably 50° or more. On the other hand, when focusing on the separation ability between P-polarized light and S-polarized light, the arrangement angle needs to be smaller than 70°, and especially to be 60° or less. That is, in consideration of both cases, the arrangement angle of the dichroic mirror 18 may preferably be set in a range of 50° or more and 60° or less.

In the above embodiment, the emission wavelength width of the semiconductor laser is 440 to 455 nm. However, even if the wavelength band shifts with the wavelength of 15 nm (e.g., 447 to 462 nm, 457 to 472 nm), a similar effect can be obtained by altering the characteristics of the dichroic mirror 18 depending on the wavelength of the semiconductor laser.

As a width d (hereinafter, referred to as "wavelength separation width") between the half-value of the S-polarized light transmittance of the dichroic mirror 18 and the half-value of the P-polarized light transmittance becomes wider, the wavelength separation ability increases. Thus, the dichroic mirror 18 is designed to have a wavelength separation width d of 26 nm or more, for example.

3. Effect, etc.

The projection-type image display apparatus 100 of the present embodiment includes a light source unit (110) that emits light, a video generating unit (160) that generates image light according to an input video signal, a light-guide optical system (140) that guides the light from the light source unit to the video generating unit, and a projection optical system (180) that projects the image light generated by the video generating unit. The light source unit (110) has a solid light source unit (12) that produces light; a phosphor wheel (20) that is excited by the light from the solid light source unit (12), and a dichroic mirror (18) that directs the light from the solid light source unit (12) to the phosphor wheel. The dichroic mirror (18) is arranged with an incident angle of the light from the solid light source unit (12) being 50° or more and 60° or less.

As described above, the dichroic mirror 18 of the light source unit 110 is arranged with an angle (55° in this embodiment) greater than 45° relative to the optical path, instead of the ordinary 45° arrangement. By virtue of this, the light source unit 110 can be miniaturized while keeping a high wavelength separation ability of the dichroic mirror.

As set forth hereinabove, the embodiments considered as the best modes and other embodiments have been provided through the accompanying drawings and detailed description. These are provided for those skilled in the art to exemplify subject matters defined in the claims by referring to the specific embodiments. Accordingly, in the scope of patent claims and their equivalents, the above embodiments could be subjected to various changes, permutations, additions, omissions, etc.

INDUSTRIAL APPLICABILITY

The present disclosure is applicable to a projection-type image display apparatus such as a projector.

The invention claimed is:

1. A projection-type image display apparatus comprising:
a light source unit that emits light;
an image generating unit that generates image light according to an input video signal;
a light-guide optical system that guides the light from the light source unit to the image generating unit; and
a projection optical system that projects the image light generated by the image generating unit, wherein
the light source unit includes
a light source that produces light,
phosphor that is excited by the light from the light source, and
a dichroic mirror that directs the light from the light source to the phosphor, the dichroic mirror is arranged with an incident angle of the light from the light source being 55°.

2. The projection-type image display apparatus according to claim 1, further comprising a second mirror that reflects the light from the light source toward the dichroic mirror,
wherein the second mirror is arranged with an angle of reflection of the light from the light source is equal to the incident angle.

3. The projection-type image display apparatus according to claim 1, wherein
the dichroic mirror reflects the light from the light source to direct the reflected light to the phosphor, and allows the light from the phosphor to pass through the dichroic mirror to the light-guide optical system.

4. The projection-type image display apparatus according to claim 1, wherein
characteristics of the dichroic mirror are set such that a width between a half-value of an S-polarized light transmittance and a half-value of a P-polarized light transmittance of the dichroic mirror is 26 nm or more.

* * * * *